United States Patent
Jung et al.

(10) Patent No.: US 10,924,257 B2
(45) Date of Patent: Feb. 16, 2021

(54) METHOD AND APPARATUS FOR CANCELING SELF INTERFERENCE SIGNAL IN COMMUNICATION SYSTEM

(71) Applicant: ELECTRONICS AND TELECOMMUNICATIONS RESEARCH INSTITUTE, Daejeon (KR)

(72) Inventors: Jae Ho Jung, Daejeon (KR); Kwang Seon Kim, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/393,616

(22) Filed: Apr. 24, 2019

(65) Prior Publication Data

US 2019/0327070 A1    Oct. 24, 2019

(30) Foreign Application Priority Data

Apr. 24, 2018    (KR) .................. 10-2018-0047155

(51) Int. Cl.
   *H04L 5/14*    (2006.01)
   *H04B 1/00*    (2006.01)
   *H04B 1/7107*    (2011.01)

(52) U.S. Cl.
   CPC ......... *H04L 5/1461* (2013.01); *H04B 1/0028* (2013.01); *H04B 1/7107* (2013.01)

(58) Field of Classification Search
   CPC .. H04B 1/7107; H04B 17/345; H04B 1/0475; H04B 7/15585
   See application file for complete search history.

(56) References Cited

U.S. PATENT DOCUMENTS

| | | | |
|---|---|---|---|
| 9,871,647 B2 | 1/2018 | Kim et al. | |
| 9,893,871 B2 | 2/2018 | Chang et al. | |
| 2008/0089397 A1* | 4/2008 | Vetter | H04B 1/525 375/220 |
| 2014/0204808 A1 | 7/2014 | Choi et al. | |
| 2015/0263780 A1* | 9/2015 | Mehlman | H04L 5/14 375/219 |

(Continued)

OTHER PUBLICATIONS

Vallese, "Self-Interference Cancellation for Multi-Antenna Full Duplex Radio Systems" WSA, Qualcomm CDMA Technologies GmbH, Mar. 2017, Berlin, Germany.

*Primary Examiner* — Raj Jain (57) ABSTRACT

Disclosed are a method and apparatus for canceling self-interference signals in a communication system. A first communication node includes a signal transmission unit configured to generate a first RF signal, an antenna module configured to transmit the first RF signal generated by the signal transmission unit and receive a second RF signal from a second communication node, a signal reception unit configured to process the second RF signal and a self-interference signal caused by the first RF signal, and an SIC circuit configured to cancel the self-interference signal. The SIC circuit includes a DSIC circuit for canceling the self-interference signal in a digital domain and an ASIC circuit and an HSIC circuit for canceling the self-interference signal in an analog domain. Accordingly, the performance of the communication system may be enhanced.

11 Claims, 9 Drawing Sheets

(56) References Cited

U.S. PATENT DOCUMENTS

| | | | |
|---|---|---|---|
| 2016/0127111 A1* | 5/2016 | Chang | H04B 1/123 370/277 |
| 2016/0149691 A1 | 5/2016 | Chang et al. | |
| 2016/0277063 A1 | 9/2016 | Liu | |
| 2016/0329982 A1* | 11/2016 | Lim | H04B 1/525 |
| 2017/0170948 A1* | 6/2017 | Eltawil | H04B 1/525 |
| 2018/0013466 A1* | 1/2018 | Kim | H04L 5/0055 |
| 2018/0205533 A1* | 7/2018 | Lee | H04B 1/525 |
| 2018/0212744 A1* | 7/2018 | Mishra | H04L 5/14 |
| 2019/0327070 A1* | 10/2019 | Jung | H04B 1/0028 |

\* cited by examiner

METHOD AND APPARATUS FOR CANCELING SELF INTERFERENCE SIGNAL IN COMMUNICATION SYSTEM

CLAIM FOR PRIORITY

This application claims priority to Korean Patent Application No. 10-2018-0047155 filed on Apr. 24, 2018 in the Korean Intellectual Property Office (KIPO), the entire contents of which are hereby incorporated by reference.

BACKGROUND

1. Technical Field

Example embodiments of the present invention relate in general to a technology for canceling self-interference signals and more specifically to a technology for canceling self-interference signals in a communication system that supports In-band Full-Duplex (IFD).

2. Related Art

In order to process wireless data that is rapidly increasing after the commercialization of 4th Generation (4G) communication systems (e.g., Long Term Evolution (LTE) communication systems, LTE-Advanced (LTE-A) communication systems, and the like), 5th Generation (5G) communication systems (e.g., New Radio (NR) communication systems), which use not only the frequency band of the 4G communication systems (e.g., a frequency band of 6 GHz or less) but also a frequency band (e.g., a frequency band of 6 GHz or more) higher than the frequency band of the 4G communication systems. The 5G communication system may support enhanced Mobile BroadBand (eMBB), Ultra-Reliable and Low Latency Communication (URLLC), and massive Machine Type Communication (mMTC).

In the communication systems (e.g., 4G communication systems or 5G communication systems), communication may be performed based on Time Division Duplex (TDD) or Frequency Division Duplex (FDD). When TDD is used, time resources used for signal transmission may be different from time resources used for signal reception. When FDD is used, frequency resources used for signal transmission may be different from frequency resources used for signal reception.

In the communication systems (e.g., 4G communication systems or 5G communication systems), communication may also be performed based on In-band Full-Duplex (IFD). When IFD is used, time-frequency resources used for signal transmission may be the same as time-frequency resources used for signal reception. The capacity of the communication system that supports IFD may be two times the capacity of the communication system that supports TDD or FDD.

However, when IFD is used, reception performance may be degraded by a self-interference signal. Such a self-interference signal may be cancelled based on Analog Self Interference Cancellation (ASIC) or Digital Self Interference Cancellation (DSIC). A self-interference signal present inside a digital dynamic range, which is an available reception range in a digital domain of a communication node, may be cancelled based on DSIC, and a self-interference signal present outside the digital dynamic range may be cancelled based on ASIC.

The performance of the communication system supporting IFD may be determined by ASIC performance. It is necessary to accurately model a channel for the self-interference signal caused by a transmission signal to enhance the ASIC performance, and the implementation complexity of an ASIC circuit is increased to accurately model the channel.

SUMMARY

Accordingly, example embodiments of the present invention are provided to substantially obviate one or more problems due to limitations and disadvantages of the related art.

Example embodiments of the present invention provide a method and apparatus for canceling a self-interference signal in a communication system that supports In-band Full Duplex (IFD).

According to embodiments of the present disclosure, a first communication node for performing communication based on In-band Full-Duplex (IFD), the first communication mode comprises a signal transmission unit configured to generate a first radio frequency (RF) signal; an antenna module configured to transmit the first RF signal generated by the signal transmission unit and receive a second RF signal from a second communication node; a signal reception unit configured to process the second RF signal and self-interference signals caused by the first RF signal; and a Self Interference Cancellation (SIC) circuit for canceling the self-interference signal, wherein the SIC circuit comprises a Self Interference (SI) signal estimator for estimating the self-interference signal, a Digital SIC (DSIC) circuit for canceling the self-interference signals in a digital domain, and an Analog SIC (ASIC) and a Hybrid SIC (HSIC) circuit for canceling the self-interference signals in an analog domain.

Here, among the self-interference signals, a self-interference signal having a first magnitude may be cancelled by the ASIC circuit, and a self-interference signal having a second magnitude may be cancelled by the HSIC circuit.

Here, the ASIC circuit may be an analog circuit composed of analog devices, and each of the HSIC circuit and the DSIC circuit may be a digital circuit composed of digital devices.

Here, the ASIC circuit may be composed of one RF phase shifter and two RF attenuators.

Here, the HSIC circuit may have an input end connected to the SI signal estimator and a TX baseband processing unit included in the signal transmission unit and an output end connected to a digital-to-analog-converter (DAC) included in the signal transmission unit.

Here, the signal transmission unit may comprise a TX baseband processing unit, a digital-to-analog-converter (DAC) connected to an output end of the TX baseband processing unit, a frequency up-converter connected to an output end of the DAC, and an amplifier connected to an output end of the frequency up-converter.

Here, the signal reception unit may comprise an RX baseband processing unit, an analog-to-digital converter (ADC) connected to an input end of the RX baseband processing unit, a frequency down-converter connected to an input end of the ADC, and an amplifier connected to an input end of the frequency down-converter.

Here, the first communication node further may comprise an ASI canceller and an HSI canceller, the ASI canceller has an input end connected to an output end of the antenna module and an output end of the ASIC circuit and an output end connected to an input end of the HSI canceller, and the ASI canceller cancels a self-interference signal estimated by the ASIC circuit from an output signal of the antenna module.

Here, the input end of the HSI canceller may be connected to an output end of the ASI canceller and an output end of the HSIC circuit through an RF device included in the signal transmission unit, the HSI canceller may have an output end connected to an input end of an amplifier included in the signal reception unit, and the HSI canceller may cancel a self-interference signal estimated by the HSIC circuit from an output signal of the ASI canceller.

Here, coefficients of analog devices constituting the ASIC circuit may be determined based on original self-interference signals caused by a training signal generated by the signal transmission unit.

Here, coefficients of digital devices constituting the HSIC circuit may be determined based on self-interference signals other than self-interference signals cancelled by the ASIC circuit among original self-interference signals caused by a training signal generated by the signal transmission unit.

Here, coefficients of digital devices constituting the DSIC circuit may be determined based on self-interference signals other than self-interference signals cancelled by the ASIC circuit and the HSIC circuit among original self-interference signals caused by a training signal generated by the signal transmission unit.

According to embodiments of the present disclosure, a method of operating a first communication node including a signal transmission unit, an antenna module, and a Self Interference Cancellation (SIC) circuit, the method comprises transmitting a first training signal generated by the signal transmission unit through the antenna module; estimating a first interference transfer function on the basis of a first self-interference signal caused by the first training signal transmitted through the antenna module; determining coefficients of devices constituting an Analog SIC (ASIC) circuit such that a Self Interference (SI) channel corresponding to the first interference transfer function is modeled in the ASIC circuit included in the SIC circuit; transmitting a second training signal generated by the signal transmission unit through the antenna module; estimating a second interference transfer function on the basis of self-interference signals other than a self-interference signal estimated by the ASIC circuit from a second self-interference signal caused by the second training signal transmitted through the antenna module; and determining coefficients of devices constituting a Hybrid SIC (HSIC) circuit included in the SIC circuit such that an SI channel corresponding to the second interference transfer function is modeled in the HSIC circuit.

Here, the method may further comprise transmitting a third training signal generated by the signal transmission unit through the antenna module; estimating a third interference transfer function on the basis of self-interference signals other than self-interference signals estimated by the ASIC circuit and the HSIC circuit from a third self-interference signal caused by the third training signal transmitted through the antenna module; and determining coefficients of devices constituting a Digital SIC (DSIC) circuit included in the SIC circuit such that an SI channel corresponding to the third interference transfer function is modeled in the DSIC circuit.

Here, the method may further comprise transmitting a first data signal to a second communication node using first frequency-time resources and receiving a second data signal from the second communication node using the first frequency-time resources when the determination of the coefficients of the devices constituting the ASIC circuit, the devices constituting the HSIC circuit, and the devices constituting the DSIC circuit are completed; a first interference cancellation step in which the self-interference signal estimated by the ASIC circuit is cancelled from the second data signal and original self-interference signals caused by the first data signal; a second interference cancellation step in which the self-interference signal estimated by the HSIC circuit is cancelled from an output signal of the first interference cancellation step; and a third interference cancellation step in which a self-interference signal estimated by the DSIC circuit is canceled from an output signal of the second interference cancellation step.

Here, among the original self-interference signals, an original self-interference signal having a first magnitude may be cancelled by the ASIC circuit, and an original self-interference signal having a second magnitude may be cancelled by the HSIC circuit.

Here, the second interference cancellation step may be performed while properties of the SI channel modeled by the ASIC circuit do not change.

Here, the ASIC circuit may be an analog circuit composed of analog devices, and each of the HSIC circuit and the DSIC circuit may be a digital circuit composed of digital devices.

Here, the determining of the coefficients of the devices constituting the ASIC circuit may be repeatedly performed to reflect a change in an SI channel having a fast fading property.

Here, the determining of the coefficients of the devices constituting the HSIC circuit may be repeatedly performed to reflect a change in an SI channel having a slow fading property.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, a communication system to which embodiments according to the present disclosure will be described. However, the communication systems to which the embodiments according to the present disclosure are applied are not restricted to what will be described below. That is, the embodiments according to the present disclosure may be applied to various communication systems. Here, the communication system may be used in the same sense as a communication network.

Figure 1:
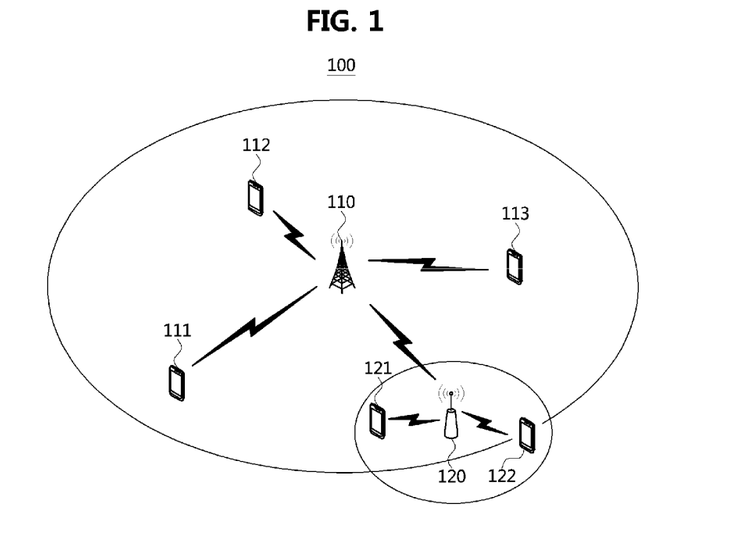
FIG. 1 is a conceptual view showing a first embodiment of a communication system.

FIG. 1 is a conceptual view showing a first embodiment of a communication system.

Referring to FIG. 1, a communication system 100 may include a plurality of communication nodes 110, 111, 112, 113, 120, 121, and 122. Also, the communication system 100 may further include a core network (e.g., a serving-gateway (S-GW), a PDN (packet data network)-gateway (P-GW), a mobility management entity (MME), and the like). A plurality of communication nodes may support 4th Generation (4G) communication (e.g., long term evolution (LTE), LTE-Advanced (LTE-A)) and 5th Generation (5G) communication (e.g., new radio (NR) communication) defined in the 3rd generation partnership project (3GPP) standard. When the communication system 100 supports 5G communication, the core network may include an access and mobility management function (AMF), a user plane function (UPF), a session management function (SMF), and the like.

For example, each of the plurality of communication nodes 110, 111, 112, 113, 120, 121, and 122 may support a code division multiple access (CDMA)-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, a Filtered OFDM-based communication protocol, an orthogonal frequency division multiple access (OFDMA)-based communication protocol, a single carrier (SC) FDMA-based communication protocol, a non-orthogonal multiple access (NOMA)-based communication protocol, a generalized frequency division multiplexing (GFDM)-based communication protocol, a filter bank multi-carrier (FBMC)-based communication protocol, a universal filtered multi-carrier (UFMC)-based communication protocol, a space division multiple access (SDMA)-based communication protocol, or the like.

Each of the plurality of communication nodes 110, 111, 112, 113, 120, 121, and 122 may have structures that will be described below.

Figure 2:
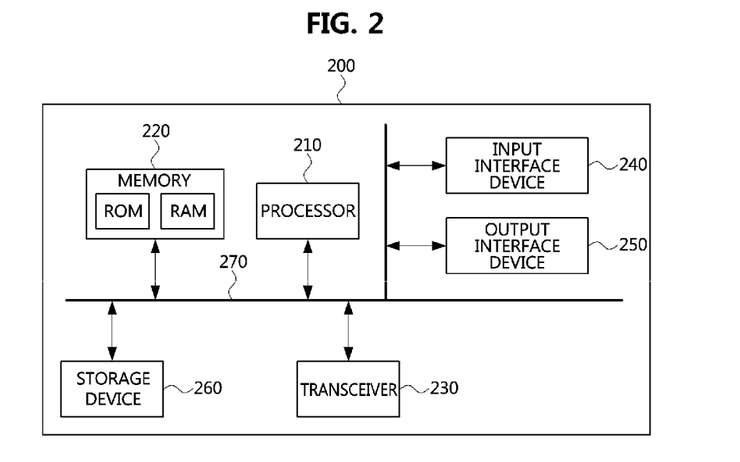
FIG. 2 is a block diagram showing a first embodiment of a communication node which is one element of a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring to FIG. 1 again, in the communication system 100, the base station 110 may form a macro cell or a small cell and may be connected to the core network via ideal backhaul or non-ideal backhaul. The base station 110 may transmit signals received from the core network to terminals #11, #12, and #13 111, 112, and 113 and may transmit signals received from terminals #11, #12, and #13 111, 112, and 113 to the core network. Terminals #11, #12, and #13 111, 112, and 113 may be inside the cell coverage of the base station 110. Terminals #11, #12, and #13 111, 112, and 113 may connect to the base station 110 by performing a connection establishment procedure together with the base station 110. Terminals #11, #12, and #13 111, 112, and 113 may connect to the base station 110 and then communicate with the base station 110.

The relay 120 may be connected to the base station 110 and relay communication between the base station 110 and terminals #21 and #22 121 and 122. The relay 120 may transmit signals received from the base station 110 to terminals #21 and #22 121 and 122 and may transmit signals received from terminals #21 and #22 121 and 122 to the base station 110. Terminal #21 121 may be inside the cell coverage of the base station 110 and inside the cell coverage of the relay 120, and terminal #22 122 may be inside the cell coverage of the relay 120. That is, terminal #22 122 may be located outside the cell coverage of the base station 110. Terminals #21 and #22 121 and 122 may connect to the relay 120 by performing a connection establishment procedure together with the relay 120. Terminals #21 and #22 121 and 122 may connect to the relay 120 and then communicate with the relay 120.

The base station 110 and the relay 120 may support multiple input multiple output (MIMO) transmission (e.g., single user (SU)-MIMO, multi user (MU)-MIMO, massive MIMO, etc.), coordinated multipoint (CoMP) transmission, carrier aggregation (CA) transmission, unlicensed-band transmission, device-to-device (D2D) communication (or proximity services (ProSe)), and the like. Here, terminals #11, #12, and #13 111, 112, and 113 may perform an operation corresponding to the base station 110, an operation supported by the base station 110, etc. Terminals #21 and #22 121 and 122 may perform an operation corresponding to the relay 120, an operation supported by the relay 120, etc.

Here, the base station 110 may be referred to as a NodeB, an evolved NodeB, a base transceiver station (BTS), a radio remote head (RRH), a transmission reception point (TRP), a radio unit (RU), a road side unit (RSU), a radio transceiver, an access point, an access node, or the like. The relay 120 may be referred to as a small base station, a relay node, or the like. The plurality of terminals 111, 112, 113, 121, and 122 may be referred to as a user equipment (UE), an access terminal, a mobile terminal, a station, a subscriber station, a mobile station, a portable subscriber station, a node, a device, an on-board unit (OBU), or the like.

Next, self-interference cancellation methods in communication systems will be described below. Although a method (e.g., signal transmission or reception) performed by a first communication node among the communication nodes will be described below, a second communication node corresponding to the first communication node may perform a method (e.g., signal transmission or reception) corresponding to the method performed by the first communication node. That is, when the operation of the terminal is described, the base station corresponding to the terminal may perform an operation corresponding to the operation of the terminal. On the other hand, when the operation of the base station is described, the terminal corresponding to the base station may perform an operation corresponding to the operation of the base station.

In the communication system shown in FIG. 1, communication nodes may perform communication based on Time Division Duplex (TDD), Frequency Division Duplex (FDD), or In-band Full Duplex (IFD). When TDD is used, time resources used for signal transmission may be different from time resources used for signal reception. When FDD is used, frequency resources used for signal transmission may be different from frequency resources used for signal reception. When IFD is used, time-frequency resources used for signal transmission may be the same as time-frequency resources used for signal reception. The IFD-based communication may be performed as follows.

Figure 3:
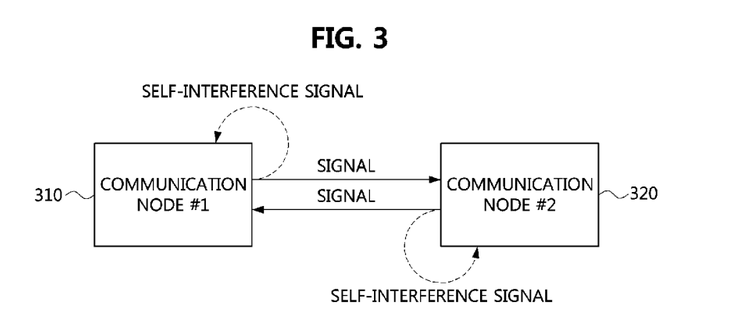
FIG. 3 is a conceptual view showing a first embodiment of a communication scenario based on In-band Full-Duplex (IFD)

FIG. 3 is a conceptual view showing a first embodiment of a communication scenario based on In-band Full-Duplex (IFD).

Referring to FIG. 3, communication node #1 310 and communication node #2 320 may perform IFD-based communication. Communication node #1 310 may be the base station shown in FIG. 1, and communication node #2 320 may be the terminal shown in FIG. 1. Alternatively, communication node #1 310 may be the terminal shown in FIG. 1, and communication node #2 320 may be the base station shown in FIG. 1. Communication node #1 310 may transmit signals to communication node #2 320 using time-frequency resources and may receive signals from communication node #2 320 through the same time-frequency resources as those used for signal transmission. A self-interference signal may be generated due to a transmission signal of communication node #1 310, and reception performance at communication node #1 310 may be degraded by the self-interference signal. That is, since a self-interference signal caused by the transmission signal of communication node #1 310 and the signal of communication node #2 320 are received through the same time-frequency resources, the reception performance at communication node #1 310 may be degraded.

Also, communication node #2 320 may transmit signals to communication node #1 310 using time-frequency resources and may receive signals from communication node #1 310 through the same time-frequency resources as those used for signal transmission. A self-interference signal may be generated due to a transmission signal of communication node #2 320, and reception performance at communication node #2 320 may be degraded by the self-interference signal. That is, since a self-interference signal caused by the transmission signal of communication node #2 320 and the signal of communication node #1 310 are received through the same time-frequency resources, the reception performance at communication node #2 320 may be degraded.

In order to prevent the degradation of the reception performance by the self-interference signal, communication node #1 310 and communication nodes #2 320 may cancel the self-interference signal. A self-interference signal present inside a digital dynamic range, which is an available reception range in a digital domain of each of communication node #1 310 and communication node #2 320, may be cancelled based on DSIC, and a self-interference signal present outside a digital dynamic range may be cancelled based on ASIC. That is, each of communication nodes #1 310 and #2 320 may include an ASIC circuit and a DSIC circuit for canceling a self-interference signal. A communication node including an ASIC circuit and a DSIC circuit (e.g., communication nodes #1 310 and #2 320) may be configured as follows.

Figure 4:
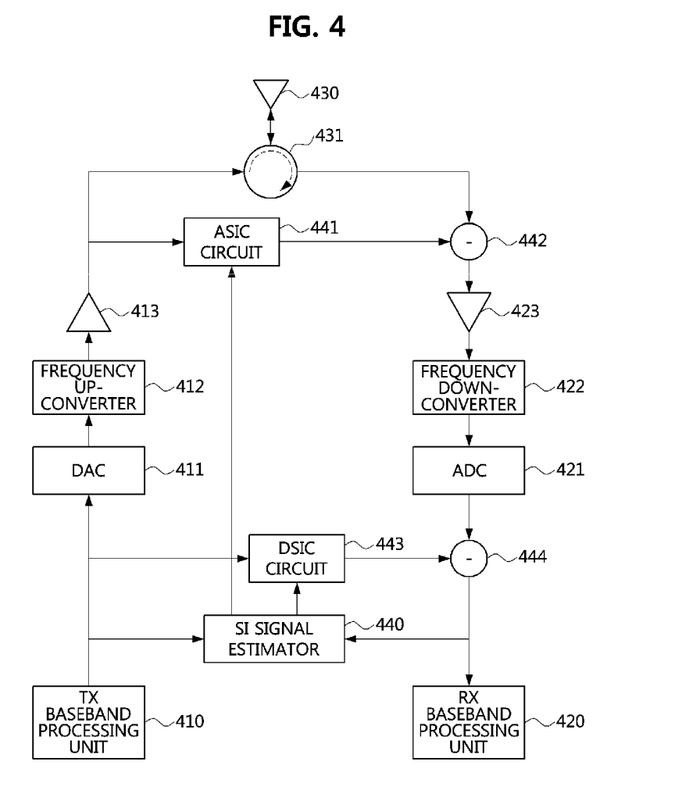
FIG. 4 is a block diagram showing a first embodiment of a communication node which supports IFD.

FIG. 4 is a block diagram showing a first embodiment of a communication node which supports IFD.

Referring to FIG. 4, the communication node may include a signal transmission unit, a signal reception unit, an antenna module, and an SIC processing unit. The signal transmission unit may include a TX baseband processing unit 410, a digital-to-analog converter (DAC) 411, a frequency up-converter 412, a high-power amplifier 413, and the like. The signal reception unit may include an RX baseband processing unit 420, an analog-to-digital converter (ADC) 421, a frequency down-converter 422, a low-noise amplifier 423, and the like. The antenna module may include an antenna 430, a circulator 431, and the like. That is, the communication node may include a single antenna. The SIC processing unit may include a self interference (SI) signal estimator 440, an ASIC circuit 441, an analog self interference (ASI) canceller 442, a DSIC circuit 443, a DSI canceller 444, and the like.

The communication node may transmit or receive signals using the same time-frequency resources. Since the matching property of the antenna 430 of the communication node is not perfect, a reflection signal (e.g., a leakage signal) may be caused by the antenna 430. The reflection signal of the antenna 430 may be 5% to 10% of the transmission signal. The reflection signal of the antenna 430 may enter the signal transmission unit and the signal reception unit of the communication node. In this case, the reflection signal of the antenna 430 does not greatly affect the performance of the signal transmission unit, but the performance of the signal reception unit may be degraded by the reflection signal of the antenna 430. For example, the signal reception unit may be saturated by the reflection signal of the antenna 430, and the reflection signal of the antenna 430 may act as a self-interference signal for an original signal that should have been actually received from the antenna 430.

Such a self-interference signal may be cancelled by the SIC processing unit. A digital self-interference signal present inside a digital dynamic range may be cancelled by the DSIC circuit 443 and the DSI canceller 444, and an analog self-interference signal present outside the digital dynamic range may be cancelled by the ASIC circuit 441 and the ASI canceller 442. The performance of the SIC processing unit may be determined by performance for canceling analog self-interference signals, and it is necessary to accurately model a channel (e.g., the SI channel) for a self-interference signal caused by a transmission signal in order to improve the performance of the SIC processing unit.

In order to accurately model the channel for the self-interference signal, the ASIC circuit 441 may be composed of a large number of radio frequency (RF) devices (e.g., an RF attenuator, an RF phase shifter, etc.), and thus the implementation complexity of the ASIC circuit 441 may increase. Also, the RF devices constituting the ASIC circuit 441 may be operated by digital control, and even when a large number of RF devices are used, desired output resolution may not be obtained in the ASIC circuit 441 due to limitation on the number of control lines.

In detail, some transmission signals may be reflected by the antenna 430 and re-input to the signal reception unit, and other transmission signals may be leaked from the RF circuit (e.g., the circulator 431) and re-input to the signal reception unit. The magnitude of a self-interference signal (e.g., the reflecting signal of the antenna 430, the leakage signal of the RF circuit, etc.) input to the signal reception unit may be about 15 to 20 dBm less than the magnitude of the transmission signal. For example, when the magnitude of the transmission signal is 20 dBm, a self-interference signal having a magnitude of 0 dBm may be input to the signal reception unit. The low-noise amplifier 423 of the signal reception unit may be destroyed/saturated by the self interference signal having a magnitude of 0 dBm. Therefore, an ASIC circuit 441 for canceling self-interference of about 50 dB or more will be needed to cancel the self-interference signal having a magnitude of 0 dBm. Since the ASIC circuit 441 for canceling self-interference of about 50 dB or more should be composed of 10 or more RF attenuators and 10 or more RF phase shifters, the implementation complexity of the ASIC circuit 441 is very high.

In order to solve this problem, the ASIC circuit 441 may be used to cancel self-interference of about 20 dB, and a hybrid SIC (HSIC) circuit may be introduced to cancel self-interference of about 30 dBm. A communication node including the HSIC circuit may be configured as follows.

Figure 5:
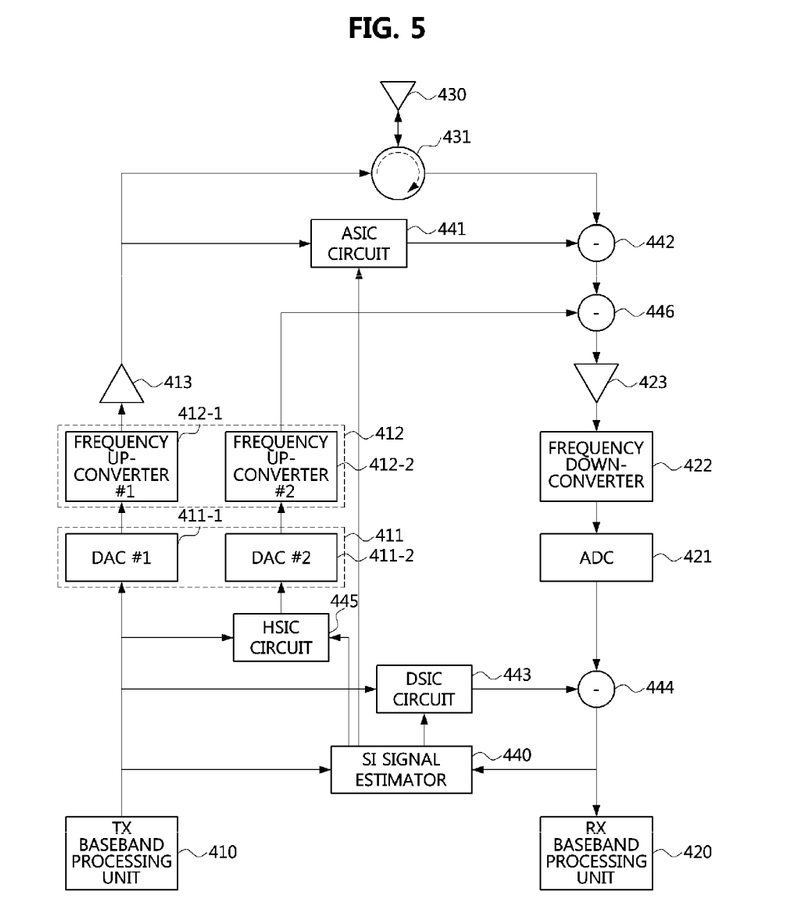
FIG. 5 is a block diagram showing a second embodiment of a communication node which supports IFD.

FIG. 5 is a block diagram showing a second embodiment of a communication node which supports IFD.

Referring to FIG. 5, the communication node may include a signal transmission unit, a signal reception unit, an antenna module, and an SIC processing unit. The communication node shown in FIG. 5 may further include the HSIC circuit 445 and may include RF devices (e.g., DAC #2 411-2, frequency up-converter #2 412-2, HSI canceller 446, etc.) for the HSIC circuit 445. For example, the signal transmission unit may include a TX baseband processing unit 410, DAC #1 411-1, frequency up-converter #1 412-1, a high-power amplifier 413, and the like. The signal reception unit may include an RX baseband processing unit 420, an ADC 421, a frequency down-converter 422, a low-noise amplifier 423, and the like. The antenna module may include an antenna 430, a circulator 431, and the like.

The SIC processing unit may include an SI signal estimator 440, an ASIC circuit 441, an ASI canceller 442, a DSIC circuit 443, a DSI canceller 444, an HSIC circuit 445, an HSI canceller 446, and the like. Also, the communication node may include DAC #2 411-2, frequency up-converter #2 412-2, and the like for the HSIC circuit 445. The HSIC circuit 445, DAC #2 411-2, and frequency up-converter #2 412-2 may constitute a sub-transmission path in the communication node, and the RF devices constituting the sub-transmission path (e.g., the HSIC circuit 445, DAC #2 411-2, and frequency up-converter #2 412-2) may be implemented so as not to interfere with the RF devices constituting the main transmission path (e.g., DAC #1 411-1, frequency up-converter #1 412-1, and the high-power amplifier 413). Also, the RF devices constituting the sub-transmission path and the RF devices constituting the main transmission path may be implemented to have as little nonlinearity as possible.

Analog self-interference signals may be cancelled by the ASIC circuit 441 and the HSIC circuit 445. The ASIC circuit 441 may be implemented in an analog domain of the communication node, and the HSIC circuit 445 may be implemented in a digital domain of the communication node. For example, the ASIC circuit 441 may be implemented to cancel an analog self-interference signal of 20 dBm, and the HSIC circuit 445 may be implemented to cancel an analog self-interference signal of 30 dBm. In this case, the ASIC circuit 441 of FIG. 5 may be composed of fewer analog devices (e.g., RF devices) than those of the ASIC circuit 441 of FIG. 4, which is implemented to cancel an analog self-interference signal of 50 dBm. The ASIC circuit 441 for canceling an analog self-interference signal of about 20 dBm may be configured as follows.

Figure 6:
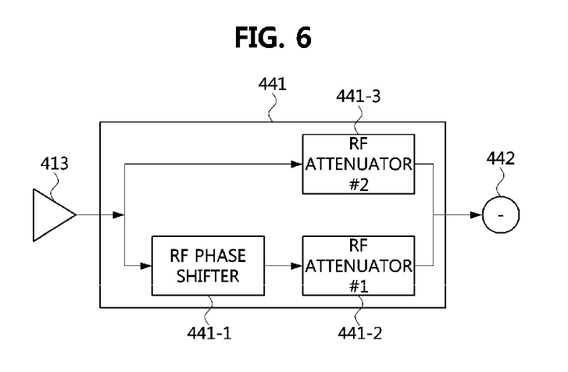
FIG. 6 is a block diagram showing a first embodiment of an Analog Self Interference Cancellation (ASIC) circuit included at a communication node.

FIG. 6 is a block diagram showing a first embodiment of an ASIC circuit included at a communication node.

Referring to FIG. 6, the ASIC circuit 441 may be composed of one RF phase shifter 441-1 and two RF attenuators 441-2 and 441-3. An analog self-interference signal of about 20 dBm may be cancelled by the ASIC circuit 441 composed of one RF phase shifter 441-1 and two RF attenuators 441-2 and 441-3. Here, the RF phase shifter 441-1 and RF attenuator #1 441-2 included in the ASIC circuit 441 may be used to cancel a leakage signal caused by an RF device (e.g., the circulator 431, etc.) of the communication node. RF attenuator #2 441-3 included in the ASIC circuit 441 may be used to cancel a reflection signal caused by the antenna 430 of the communication node.

Referring to FIG. 5 again, an analog self-interference signal of about 20 dBm may be cancelled by the ASIC circuit 441 and the ASI canceller 442. For example, the ASIC circuit 441 may model an SI channel on the basis of a transmission signal acquired from the high-power amplifier 413 and a self-interference signal acquired from the SI signal estimator 440 and may output an SI signal modeled through the SI channel model. A reception signal of the antenna 430 and a self-interference signal of the ASIC circuit 441 may be acquired through the input end of the ASI canceller 442, and the reception signal of the antenna 430 minus the self-interference signal of the ASIC circuit 441 may be output through the output end of the ASI canceller 442. In this case, an analog self-interference signal of about 20 dBm may be cancelled from the reception signal of the antenna 430.

The remaining analog self-interference signals (e.g., an analog self-interference signal of about 30 dBm), which are not removed by the ASI canceller 442, may be cancelled by the HSI canceller 446 located between the ASI canceller 442 and the low-noise amplifier 423. A circuit for canceling an analog self-interference signal of about 30 dBm (e.g., a circuit composed of a plurality of RF attenuators and a plurality of RF phase shifters) may be implemented in a digital domain. That is, the HSIC circuit 445 implemented in the digital domain may have performance for canceling analog self-interference signals of about 30 dBm. For example, the HSIC circuit 445 may be implemented as a digital filter of about 16 taps (e.g., a digital circuit).

The HSIC circuit 445 may model an SI channel on the basis of a baseband signal generated by the TX baseband processing unit 410 and a self-interference signal estimated by the SI signal estimator 440 and may output a self-interference signal modeled through the SI channel model. An output signal of the ASI canceller 442 (e.g., the reception signal of the antenna 430 minus the self-interference signal of the ASIC circuit 441) and a self-interference signal of the HSIC circuit 445 may be acquired through the input end of the HSI canceller 446, and the reception signal of the antenna 430 minus the self-interference signal of the ASIC circuit 441 minus the self-interference signal of the HSIC circuit 445 may be output through the output end of the HSI canceller 446. In this case, an analog self-interference signal of about 30 dBm may be cancelled from the reception signal of the antenna 430. That is, an analog self-interference signal of about 50 dBm may be cancelled by the ASI canceller 442 and the HSI canceller 446.

The reception signal from which the analog self-interference signal is cancelled may be input to the low-noise amplifier 423. The output of the low-noise amplifier 423 may be input to the DSI canceller 444 via the frequency down-converter 422 and the ADC 421.

The DSIC circuit 443 may model an SI channel on the basis of a baseband signal generated by the TX baseband processing unit 410 and a self-interference signal estimated by the SI signal estimator 440 and may output a self-interference signal modeled through the SI channel model. An output signal of the ADC 421 and the self-interference signal of the DSIC circuit 443 may be acquired through the input end of the DSI canceller 444, and the output signal of the ADC 421 minus the self-interference signal of the DSIC circuit 443 may be output through the output end of the DSI canceller 444. The output signal of the DSI canceller 444 may be input to the SI signal estimator 440 and the RX baseband processing unit 420. The RX baseband processing unit 420 may restore signals on the basis of the output signal of the DSI canceller 444.

Next, the IFD-based communication method at the communication node of FIG. 5 will be described.

Figure 7:
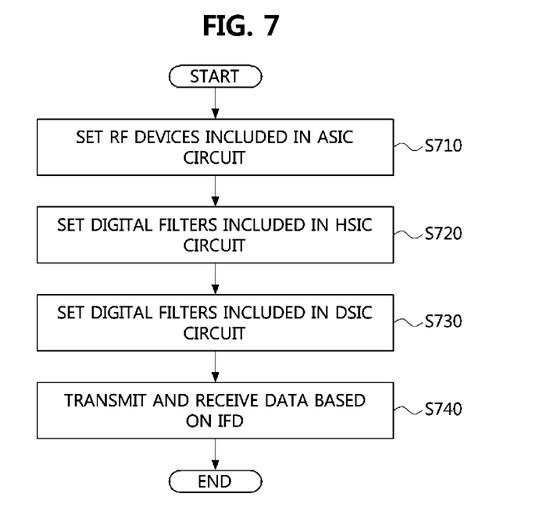
FIG. 7 is a flowchart showing a first embodiment of an IFD-based communication method at a communication node.
Figure 8:
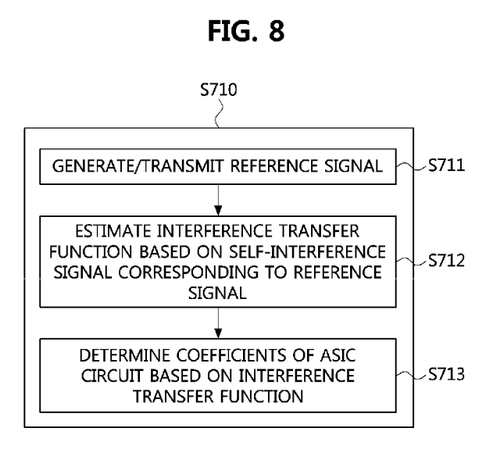
FIG. 8 is a flowchart showing a first embodiment of an ASIC circuit setting method in the IFD-based communication method.
Figure 9:
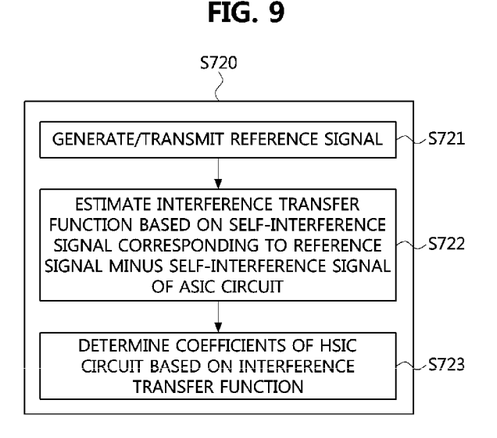
FIG. 9 is a flowchart showing a first embodiment of a Hybrid Self Interference Cancellation (HSIC) circuit setting method in the IFD-based communication method.
Figure 10:
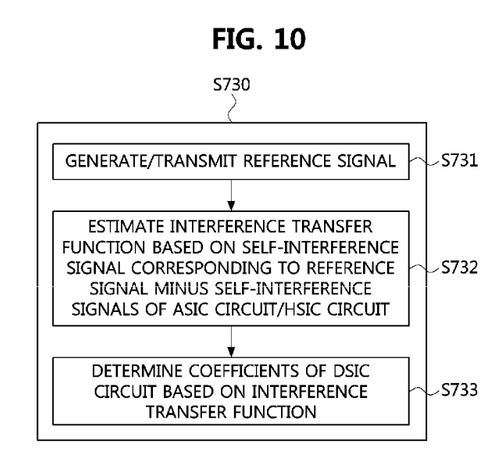
FIG. 10 is a flowchart showing a first embodiment of a Digital Self Interference Cancellation (DSIC) circuit setting method in the IFD-based communication method.
Figure 11:
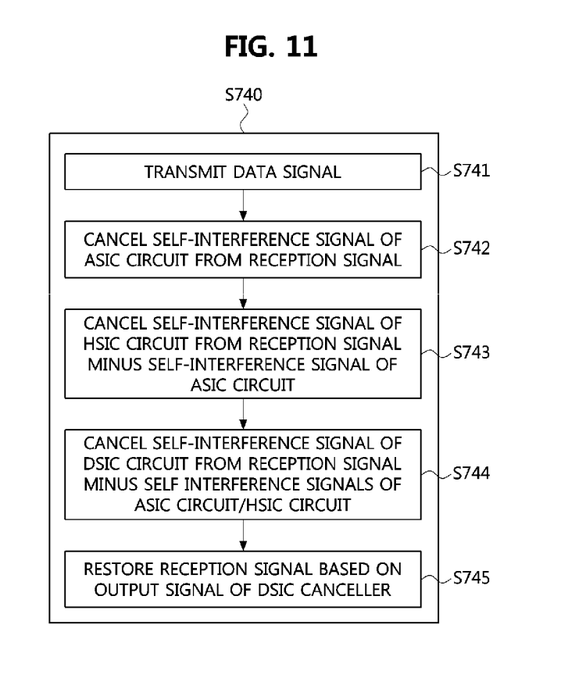
FIG. 11 is a flowchart showing a first embodiment of a data transmission and reception method in the IFD-based communication method.

FIG. 7 is a flowchart showing a first embodiment of an IFD-based communication method at a communication node, FIG. 8 is a flowchart showing a first embodiment of an ASIC circuit setting method in the IFD-based communication method, FIG. 9 is a flowchart showing a first embodiment of an HSIC circuit setting method in the IFD-based communication method, FIG. 10 is a flowchart showing a first embodiment of a DSIC circuit setting method in the IFD-based communication method, and FIG. 11 is a flowchart showing a first embodiment of a data transmission and reception method in the IFD-based communication method.

Referring to FIGS. 7 to 11, the interference cancellation method may include a step of setting the ASIC circuit 441 (e.g., coefficients of RF devices included in the ASIC circuit 441) (S710), a step of setting the HSIC circuit 445 (e.g., coefficients of digital devices included in the HSIC circuit 445) (S720), a step of setting the DSIC circuit 443 (e.g., coefficients of digital devices included in the DSIC circuit 443), and an interference cancellation step S740.

In S710, the TX baseband processing unit 410 of the communication node may generate a reference signal (e.g., a training signal), and the generated reference signal may be transmitted through a main transmission path (e.g., DAC #1 411-1→frequency up-converter #1 412-1→high-power amplifier 413→circulator 431→antenna 430) (S711).

A self-interference signal caused by the reference signal may be received by a signal reception unit of the communication node. An interference transfer function of the main transmission path may be estimated on the basis of the self-interference signal caused by the reference signal (S712). Step S712 may be performed by the SI signal estimator of the communication node. The interference transfer function of the main transmission path may be estimated by performing correlation with respect to the reference signal in the time domain. Alternatively, the interference transfer function of the main transmission path may be estimated on the basis of the inverse function of the self-interference signal in the frequency domain.

The coefficients of the RF devices included in the ASIC circuit 441 may be determined on the basis of the interference transfer function (S713). The coefficients of the RF devices included in the ASIC circuit 441 may be determined such that the SI channel modeled by the ASIC circuit 441 is as close to the interference transfer function as possible. For example, by regulating parameters of one RF phase shifter 441-1 and the two RF attenuators 441-2 and 441-3 included in the ASIC circuit 441, it is possible to determine the coefficients of the RF devices included in the ASIC circuit 441 to satisfy a target interference cancellation amount (e.g., a self-interference signal of 20 dBm).

When the coefficients of the RF devices included in the ASIC circuit 441 are determined, step S720 may be performed. In S720, the TX baseband processing unit 410 of the communication node may generate a reference signal (e.g., a training signal), and the generated reference signal may be transmitted through the main transmission path (e.g., DAC #1 411-1→frequency up-converter #1 412-1→high-power amplifier 413→circulator 431→antenna 430) and the sub-transmission path (e.g., HSIC circuit 445→DAC #2 411-2→frequency up-converter #2 412-2→HSI canceller 466) (S721).

A self-interference signal caused by the reference signal may be received by a signal reception unit of the communication node. For example, through the input end of the ASI canceller 442, a reception signal (i.e., a self-interference signal caused by the reference signal) may be acquired from the circulator 431, and a self-interference signal may be acquired from the ASIC circuit 441. The reception signal of the circulator 431 minus the self-interference signal of the ASIC circuit 441 may be output through the output end of the ASI canceller 442. The interference transfer function of the main transmission path and the interference transfer function of the sub-transmission path may be estimated on the basis of an output signal of the ASI canceller 442 (S722). In S722, the interference transfer functions may be estimated in the same or a similar manner as described in S712. The coefficients of the digital filters (e.g., digital devices) included in the HSIC circuit 445 may be determined on the basis of a proportional relationship between the interference transfer function of the main transmission path and the interference transfer function of the sub-transmission path (S723). Steps S722 and S723 may be performed by the SI signal estimator 440.

When the coefficients of the digital filters included in the HSIC circuit 445 are determined, step S730 may be performed. In S730, the TX baseband processing unit 410 of the communication node may generate a reference signal (e.g., a training signal), and the generated reference signal may be transmitted through the main transmission path (e.g., DAC #1 411-1→frequency up-converter #1 412-1→high-power amplifier 413→circulator 431→antenna 430) and the sub-transmission path (e.g., HSIC circuit 445→DAC #2 411-2→frequency up-converter #2 412-2→HSI canceller 466) (S731).

A self-interference signal caused by the reference signal may be received by a signal reception unit of the communication node. For example, through the input end of the ASI canceller 442, a reception signal (i.e., a self-interference signal caused by the reference signal) may be acquired from the circulator 431, and a self-interference signal may be acquired from the ASIC circuit 441. The reception signal of the circulator 431 minus the self-interference signal of the ASIC circuit 441 may be output through the output end of the ASI canceller 442. The output signal (e.g., the reception signal of the circulator 431 minus the self-interference signal of the ASIC circuit 441) of the ASI canceller 442 and the self-interference signal of the HSIC circuit 445 may be acquired through the input end of the HSI canceller 446. The reception signal of the circulator 431 minus the self-interference signal of the ASIC circuit 441 minus the self-interference signal of the HSIC circuit 445 may be output through the output end of the HSI canceller 446.

The output signal of the HSI canceller 446 may be processed by the low-noise amplifier 423, the frequency down-converter 422, and the ADC 421. A system interference transfer function of the communication node may be estimated on the basis of the output signal of the ADC 421 (S732). In S732, the interference transfer functions may be estimated in the same or a similar manner as described in S712. The coefficients of the digital filters included in the DSIC circuit 443 may be determined on the basis of the system interference transfer function (S733). Steps S732 and S733 may be performed by the SI signal estimator 440.

Steps S710, S720, and S730 may be repeatedly performed to correspond to a change in the SI channel. Among steps S710, S720, and S730, step S710 may be performed in the slowest cycle. While properties of the SI channel modeled by the ASIC circuit 441 do not change, self-interference may be cancelled by the HSIC circuit 445 and the HSI canceller 446. While properties of the SI channel modeled by the HSIC circuit 445 do not change, self-interference may be cancelled by the DSIC circuit 443 and the DSI canceller 444. For example, cancellation of self-interference on an SI channel (e.g., an interference transfer channel) with a fast fading property may be performed by the DSIC circuit 443 and the DSI canceller 444, cancellation of self-interference on an SI channel (e.g., an interference transfer channel) with a slow fading property may be performed by the HSIC circuit 445 and the HSI canceller 446, and cancellation of self-interference on an SI channel (e.g., an interference transfer channel) with a thermal change property may be performed by the ASIC circuit 441 and the ASI canceller 442.

When step S730 is complete, IFD-based communication may be performed (S740). For example, a transmission signal (i.e., a data signal) may be transmitted through the main transmission path and the sub-transmission path of the communication node (S741). A self-interference signal caused by a transmission signal of a communication node and a reception signal of another communication node (i.e., a signal of another communication node received from the antenna 430) may be input to the input end of the ASI canceller 442.

The ASIC circuit 441 may output a self-interference signal on the basis of a transmission signal (e.g., the transmission signal transmitted in S741) acquired from the high-power amplifier 413 and an SI channel modeled based on the coefficients determined in S710. That is, the self-interference signal generated by the ASIC circuit 441 may be input to the input end of the ASI canceller 442. The ASI canceller 442 may generate an output signal by canceling the self-interference signal of the ASIC circuit 441 from a signal acquired from the circulator 431 (e.g., a self-interference signal caused by the transmission signal of the communication node plus a reception signal of another communication node) (S742). In S742, an analog self-interference signal of about 20 dBm may be cancelled.

The output signal of the ASI canceller 442 may be input to the HSI canceller 446. The HSIC circuit 445 may output a self-interference signal on the basis of a transmission signal (e.g., the transmission signal transmitted in S741) acquired from the TX baseband processing unit 410 and an SI channel modeled based on the coefficients determined in S720. That is, the self-interference signal generated by the HSIC circuit 445 may be input to the input end of the HSI canceller 446 through DAC #2 411-2 and frequency up-converter #2 412-2. The HSI canceller 446 may generate an output signal by canceling the self-interference signal of the HSIC circuit 445 from the signal acquired from the ASI canceller 442 (S743). In S743, an analog self-interference signal of about 30 dBm may be cancelled.

The output signal of the HSI canceller 446 may be input to the DSI canceller 444 via the low-noise amplifier, the frequency down-converter 422, and the ADC 421. The DSIC circuit 443 may output a self-interference signal on the basis of a transmission signal (e.g., the transmission signal transmitted in step S741) acquired from the TX baseband processing unit 410 and an SI channel modeled based on the coefficients determined in step S730. That is, the self-interference signal generated by the DSIC circuit 443 may be input to the DSI canceller 444. The DSI canceller 444 may generate an output signal by canceling the self-interference signal of the DSIC circuit 443 from the signal acquired from the ADC 421 (S744). The output signal of the DSI canceller 444 may be input to an RX baseband processing unit 420. The RX baseband processing unit 420 may restore reception signals on the basis of the output signal of the DSI canceller 444 (S745).

While the communication node includes a single antenna in the above-described embodiments, the communication node may be configured to include a plurality of antennas. A communication node including the plurality of antennas may be configured as follows.

Figure 12:
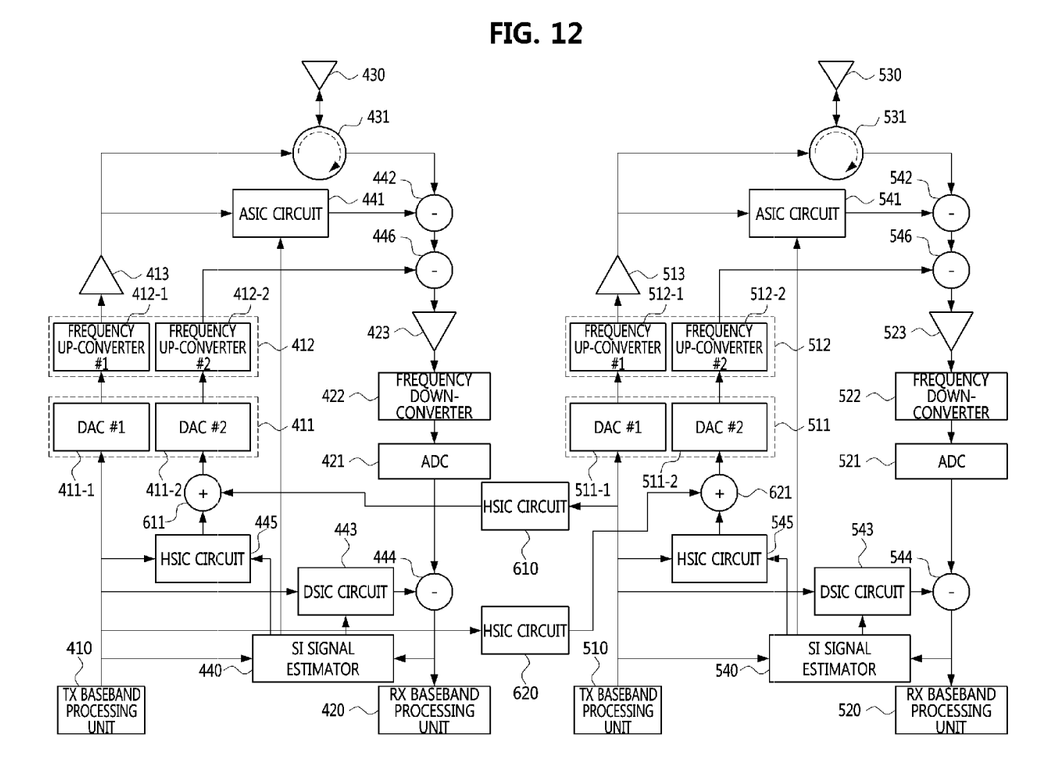
FIG. 12 is a block diagram showing a third embodiment of a communication node which supports IFD.

FIG. 12 is a block diagram showing a third embodiment of a communication node which supports IFD.

Referring to FIG. 12, the communication node may include signal transmission unit #1-2, signal reception unit #1-2, antenna module #1-2, and SIC processing unit #1-2. For example, signal transmission unit #1 may include a TX baseband processing unit 410, DAC #1 411-1, frequency up-converter #1 412-1, a high-power amplifier 413, and the like. Signal reception unit #1 may include an RX baseband processing unit 420, an ADC 421, a frequency down-converter 422, a low-noise amplifier 423, and the like. Antenna module #1 may include an antenna 430, a circulator 431, and the like. SIC processing unit #1 may include an SI signal estimator 440, an ASIC circuit 441, an ASI canceller 442, a DSIC circuit 443, a DSI canceller 444, an HSIC circuit 445, an HSI canceller 446, and the like. Also, the communication node may include a DAC #2 411-2, frequency up-converter #2 412-2, and the like for the HSIC circuit 445.

Also, signal transmission unit #2 may include a TX baseband processing unit 510, DAC #1 511-1, frequency up-converter #1 512-1, a high-power amplifier 513, and the like. Signal reception unit #2 may include an RX baseband processing unit 520, an ADC 521, a frequency down-converter 522, a low-noise amplifier 523, and the like. Antenna module #2 may include an antenna 530, a circulator 531, and the like. SIC processing unit #2 may include an SI signal estimator 540, an ASIC circuit 541, an ASI canceller 542, a DSIC circuit 543, a DSI canceller 544, an HSIC circuit 545, an HSI canceller 546, and the like. Also, the communication node may include a DAC #2 511-2, frequency up-converter #2 512-2, and the like for the HSIC circuit 545.

That is, signal transmission units #1 and #2 of FIG. 12 may be configured to be the same as the signal transmission unit of FIG. 5, signal reception units #1 and #2 of FIG. 12 may be configured to be the same as the signal reception unit of FIG. 5, and the SIC processing unit of FIG. 12 may be configured to be the same as the SIC processing unit of FIG. 5.

However, the communication node of FIG. 12 may further include HSIC circuits 610 and 620 for estimating a self-interference signal caused by an adjacent antenna. The HSIC circuit 610 may be used to estimate a self-interference signal caused by the antenna 530, and the coefficients of the digital devices included in the HSIC circuit 610 may be determined on the basis of S720 of FIGS. 7 and 9. The self-interference signal of the HSIC circuit 610 may be summed with the self-interference signal of the HSIC circuit 445 by an adder 621. In this case, the self-interference signal caused by the antenna 530 may be cancelled by the HSIC circuit 610 and the HSI canceller 446.

Also, the HSIC circuit 620 may be used to estimate a self-interference signal caused by the antenna 430, and the coefficients of the digital devices included in the HSIC circuit 620 may be determined on the basis of S720 of FIGS. 7 and 9. The self-interference signal of the HSIC circuit 620 may be summed with the self-interference signal of the HSIC circuit 545 by the adder 621. In this case, the self-interference signal caused by the antenna 430 may be cancelled by the HSIC circuit 620 and the HSI canceller 546.

According to the present invention, a communication node that supports In-band Full-Duplex (IFD) may include an Analog Self Interference Cancellation (ASIC) circuit, a Hybrid Self Interference Cancellation (HSIC) circuit, and a Digital Self Interference Cancellation (DSIC) circuit. The ASIC circuit may be implemented in an analog domain to cancel analog self-interference signals, and the HSIC circuit may be implemented in a digital domain to cancel analog self-interference signals. A Self Interference Cancellation (SIC) circuit used to cancel analog self-interference signals may be composed of an ASIC circuit and an HSIC circuit, thereby decreasing the implementation complexity of the ASIC circuit. Also, since a channel for analog self-interference signals may be accurately modeled using an ASIC circuit and an HSIC circuit, the performance of a communication system may be improved.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A first communication node for performing communication based on In-band Full-Duplex (IFD), the first communication node comprising:
   a signal transmission unit configured to generate a first radio frequency (RF) signal;
   an antenna module configured to transmit the first RF signal generated by the signal transmission unit and receive a second RF signal from a second communication node;
   a signal reception unit configured to process the second RF signal and self-interference signals caused by the first RF signal;
   a Self Interference (SI) signal estimator for estimating the self-interference signal;
   a Digital Self Interference Cancellation (DSIC) circuit for canceling the self-interference signals in a digital domain;
   an Analog Self Interference Cancellation (ASIC) circuit for canceling the self-interference signals in an analog domain;
   a Hybrid Self Interference Cancellation (HSIC) circuit for canceling the self-interference signals in the analog domain;
   an Analog Self Interference (ASI) canceller having an input end connected to an output end of the antenna module and to an output end of the ASIC circuit, and that cancels a self-interference signal estimated by the ASIC circuit from an output signal of the antenna module; and
   a Hybrid Self Interference (HIS) canceller having an input end connected to an output end of the ASI canceller.

2. The first communication node of claim 1, wherein among the self-interference signals, a self-interference signal having a first magnitude is cancelled by the ASIC circuit, and a self-interference signal having a second magnitude is cancelled by the HSIC circuit.

3. The first communication node of claim 1, wherein the ASIC circuit is an analog circuit composed of analog devices, and each of the HSIC circuit and the DSIC circuit is a digital circuit composed of digital devices.

4. The first communication node of claim 1, wherein the ASIC circuit is composed of one RF phase shifter and two RF attenuators.

5. The first communication node of claim 1, wherein the HSIC circuit has an input end connected to the SI signal estimator and a TX baseband processing unit included in the signal transmission unit and an output end connected to a digital-to-analog-converter (DAC) included in the signal transmission unit.

6. The first communication node of claim 1, wherein the signal transmission unit comprises a TX baseband processing unit, a digital-to-analog-converter (DAC) connected to an output end of the TX baseband processing unit, a frequency up-converter connected to an output end of the DAC, and an amplifier connected to an output end of the frequency up-converter.

7. The first communication node of claim 1, wherein the signal reception unit comprises an RX baseband processing unit, an analog-to-digital converter (ADC) connected to an input end of the RX baseband processing unit, a frequency down-converter connected to an input end of the ADC, and an amplifier connected to an input end of the frequency down-converter.

8. The first communication node of claim 1, wherein the input end of the HSI canceller is connected to the output end of the ASI canceller and an output end of the HSIC circuit through an RF device included in the signal transmission unit, the HSI canceller has an output end connected to an input end of an amplifier included in the signal reception unit, and the HSI canceller cancels a self-interference signal estimated by the HSIC circuit from an output signal of the ASI canceller.

9. The first communication node of claim 1, wherein coefficients of analog devices constituting the ASIC circuit are determined based on original self-interference signals caused by a training signal generated by the signal transmission unit.

10. The first communication node of claim 1, wherein coefficients of digital devices constituting the HSIC circuit are determined based on self-interference signals other than self-interference signals cancelled by the ASIC circuit among original self-interference signals caused by a training signal generated by the signal transmission unit.

11. The first communication node of claim 1, wherein coefficients of digital devices constituting the DSIC circuit are determined based on self-interference signals other than self-interference signals cancelled by the ASIC circuit and the HSIC circuit among original self-interference signals caused by a training signal generated by the signal transmission unit.

* * * * *